US008128875B2

(12) United States Patent
Antalek et al.

(10) Patent No.: US 8,128,875 B2
(45) Date of Patent: Mar. 6, 2012

(54) HYDROGEN CONTROL SYSTEM FOR ELECTRIC GENERATOR

(75) Inventors: James Daniel Antalek, Valatie, NY (US); Jeffrey James Andritz, Altamont, NY (US); Anthony James George, Clifton Park, NY (US); Hans Milton Knuijt, Niskayuna, NY (US); Abby Marie Magro, West Hartford, CT (US); Kevin Jon O'Dell, Rensselaer, NY (US); Fotios Raftelis, Albany, NY (US); Steven Paul Scarlata, Wynantskill, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/713,677

(22) Filed: Feb. 26, 2010

(65) Prior Publication Data

US 2011/0210628 A1    Sep. 1, 2011

(51) Int. Cl.
  *G05D 7/00* (2006.01)
  *F01N 3/20* (2006.01)
  *G01N 21/00* (2006.01)
  *G01N 31/00* (2006.01)
  *G01N 33/00* (2006.01)
  *G01N 35/08* (2006.01)
(52) U.S. Cl. ............. 422/110; 422/62; 422/105; 436/55
(58) Field of Classification Search ............ 422/62, 422/105, 110; 436/55, 144
See application file for complete search history.

(56) References Cited

U.S. PATENT DOCUMENTS

| 4,455,614 | A  | * | 6/1984  | Martz et al. ............. 700/288 |
| 6,456,095 | B1 | * | 9/2002  | Sorita et al. ............. 324/703 |
| 6,893,755 | B2 |   | 5/2005  | Leboe |
| 7,011,693 | B2 |   | 3/2006  | Mallavarapu et al. |
| 7,550,113 | B2 |   | 6/2009  | Speranza et al. |
| 2003/0090164 | A1 | * | 5/2003 | Brosnihan et al. ........ 310/55 |
| 2005/0000802 | A1 | * | 1/2005 | Hobbs ................... 204/277 |
| 2007/0243624 | A1 |   | 10/2007 | Speranza et al. |
| 2009/0211920 | A1 | * | 8/2009 | Speranza et al. ......... 205/637 |
| 2010/0071889 | A1 | * | 3/2010 | Radl ..................... 165/286 |

OTHER PUBLICATIONS

European Search Report issued in connection with corresponding EP Application 1103082.2, Jun. 22, 2011.

* cited by examiner

*Primary Examiner* — Jill Warden
*Assistant Examiner* — Charles D Hammond
(74) *Attorney, Agent, or Firm* — Hoffman Warnick LLC; Ernest G. Cusick

(57) ABSTRACT

Systems for controlling hydrogen purity in a power plant system are disclosed. In one embodiment, a hydrogen control system for a generator housing includes: a mass flow control system fluidly connected to the generator housing, the mass flow control system being configured to measure a flow rate of a gas mixture extracted from the generator housing and modify the flow rate of the gas mixture across a range of flow rates; and a vent conduit fluidly connected to the mass flow control system, the vent conduit for receiving a portion of the gas mixture from the mass flow control system and feeding the portion of the gas mixture to an outlet.

20 Claims, 5 Drawing Sheets

HYDROGEN CONTROL SYSTEM FOR ELECTRIC GENERATOR

BACKGROUND OF THE INVENTION

The subject matter disclosed herein relates to hydrogen-cooled electric generators and, more particularly, to a system for controlling hydrogen flow and purity in a hydrogen-cooled electric generator.

Some power plant systems, for example certain nuclear, simple cycle and combined cycle power plant systems, employ hydrogen as a coolant for generators, which, during operation, produce large amounts of heat. Hydrogen's high heat capacity, low density and ability to reduce windage losses improves the output of the electric generator and the efficiency of the overall system. These properties make it desirable to maintain a high level of hydrogen purity within the generator. However, maintaining purity of the hydrogen in these generators is typically costly. Some power plant systems remove hydrogen via a scavenging system that extracts a portion of a mixture of gases from within the generator or drain enlargements, vents the portion of a mixture of gases to the ambient and replaces it with clean hydrogen. These systems employ a set of manually adjusted needle valves that regulate the flow of gases through the scavenging system. These manually adjusted needle valves fail to precisely control the flow of hydrogen out of the generator which may cause the generator to run inefficiently.

BRIEF DESCRIPTION OF THE INVENTION

Systems for controlling hydrogen purity in a power plant system are disclosed. In one embodiment, a hydrogen control system for a generator housing includes: a mass flow control system fluidly connected to the generator housing, the mass flow control system being configured to measure a flow rate of a gas mixture extracted from the generator housing and modify the flow rate of the gas mixture across a range of flow rates; and a vent conduit fluidly connected to the mass flow control system, the vent conduit for receiving a portion of the gas mixture from the mass flow control system and feeding the portion of the gas mixture to an outlet.

A first aspect of the disclosure provides a hydrogen control system for a generator housing including: a mass flow control system fluidly connected to the generator housing, the mass flow control system being configured to measure a flow rate of a gas mixture extracted from the generator housing and modify the flow rate of the gas mixture across a range of flow rates; and a vent conduit fluidly connected to the mass flow control system, the vent conduit for receiving a portion of the gas mixture from the mass flow control system and feeding the portion of the gas mixture to an outlet.

A second aspect provides a power generation system including: a turbine; a generator operatively connected to the turbine, the generator including a housing containing a gas mixture; a purity monitoring system (PMS) fluidly connected to the housing, the PMS for monitoring a purity of hydrogen in the gas mixture; an inlet for receiving a gas mixture from the generator housing; a mass flow control system fluidly connected to the generator housing, the mass flow control system being configured to measure a flow rate of a gas mixture extracted from the generator housing and modify the flow rate of the gas mixture across a range of flow rates; and a vent conduit fluidly connected to the mass flow control system, the vent conduit for receiving a portion of the gas mixture from the mass flow control system and feeding the portion of the gas mixture to an outlet.

A third aspect provides a combined cycle power generation system comprising: a gas turbine; a heat recovery steam generator (HRSG) operatively connected to the gas turbine; a steam turbine operatively connected to the HRSG; a generator operatively connected to at least one of the gas turbine or the steam turbine, the generator including a housing, the housing containing a gas mixture; a purity monitoring system (PMS) fluidly connected to the housing, the PMS for monitoring a purity of hydrogen in the gas mixture; a mass flow control system fluidly connected to the generator housing, the mass flow control system being configured to measure a flow rate of a gas mixture extracted from the generator housing and modify the flow rate of the gas mixture across a range of flow rates; and a vent conduit fluidly connected to the mass flow control system, the vent conduit for receiving a portion of the gas mixture from the mass flow control system and feeding the portion of the gas mixture to an outlet.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, aspects of the invention provide for controlling a flow and purity of hydrogen in a hydrogen-cooled generator using a mass flow control system. The mass flow control system measures and modifies the flow rate of the gas mixture to a vent conduit across a range of flow rates, thereby increasing the average hydrogen purity level in the system via precise control of a scavenging rate of the system.

In the art of power generation systems (including, e.g., nuclear reactors, steam turbines, gas turbines, etc.), hydrogen cooled generators are often employed as part of the system and may include a scavenging system. Typically, the scavenging system employs a set of manually adjusted needle valves and at least one solenoid valve to regulate the flow rate of gas through the scavenging system. The at least one solenoid valve is designed to open and close based upon a purity reading of hydrogen within the generator, opening when purity drops below a predetermined purity reading and closing when purity rises above a second predetermined purity reading. However, a margin of error must be built into the system because of poor tolerances and the imprecise control of this regulation system. This margin of error requires that the two predetermined purity points be manually set far outside the optimal purity range for the generator, requiring significant deviations from a given system's optimal purity level for adjustments to be made to the flow/scavenging rate. This creates a saw-tooth pattern of purity levels resulting in an undesirably low average purity level and undesirably low system efficiency. A lower average hydrogen purity level in the generator detracts from the overall efficiency of the power generation system by causing large thermal and windage losses.

Figure 1:
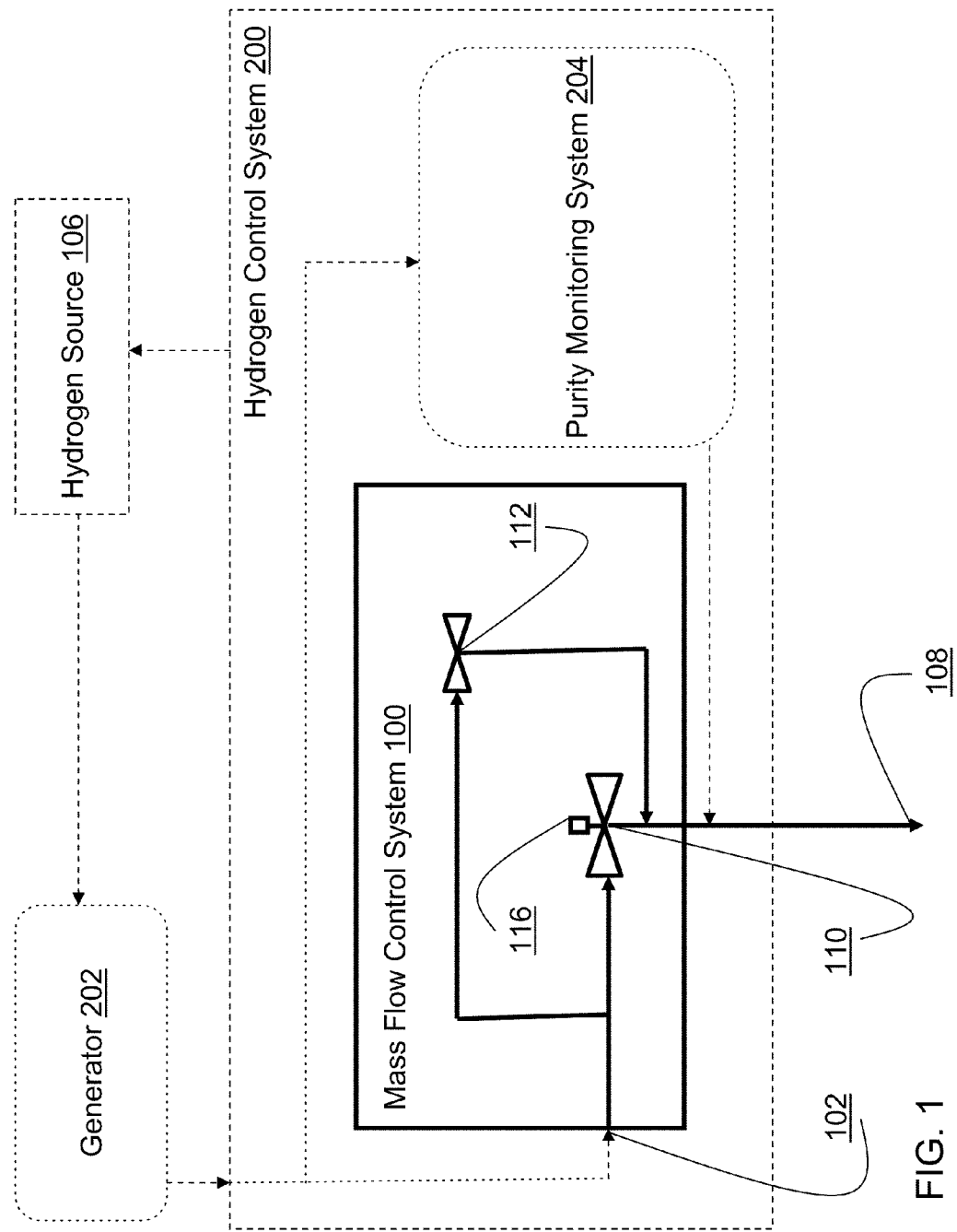
FIG. 1 shows a schematic illustration of an embodiment of a hydrogen control system in accordance with an aspect of the invention.

Turning to the figures, embodiments of a hydrogen control system including a mass flow control system are shown, where the mass flow control system may increase efficiency of the hydrogen control system and the overall power generation system by adjusting the scavenging mass flow rate across a range of flow rates. Each of the components in the figures may be connected via conventional means, e.g., via a common conduit or other known means as is indicated by arrows in the FIGS. 1-5. Specifically, referring to FIG. 1, a schematic illustration of an embodiment of a mass flow control system 100 is shown. Mass flow control system 100 may include an inlet 102, a mass flow control valve 110, a bypass valve 112 and a vent conduit 108. Mass flow control system 100 may receive an extracted gas mixture from a generator 202 via inlet 102, where inlet 102 may be any conventional conduit for feeding gas mixture to mass flow control system 100. Mass flow control system 100 measures a flow rate of the gas mixture through inlet 102 and may modify the flow rate of the gas mixture in a manner discussed further below. Vent conduit 108 receives the modified flow rate gas mixture from mass flow control system 100 and may output the gas mixture to the ambient.

In an embodiment of the present invention, mass flow control system 100 includes at least one mass flow control valve 110 which may modify a flow rate of the gas mixture through inlet 102 across a range of flow rates. The at least one mass flow control valve 110 may be a conventional mass flow control valve known in the art (e.g., a butterfly valve, a globe valve, etc.). In one embodiment, wherein the at least one mass flow control valve 110 fails to adequately perform the modifying of the flow rate across a range of flow rates, the mass flow control valve 110 closes, stopping flow of the gas mixture through mass flow control valve 110. Causes of failure may include oil contamination, loss of signal, loss of power, etc. In one embodiment, mass flow control system 100 may include at least one mass flow control valve 110 and at least one back-up solenoid valve 112 independently in fluid connection with each of inlet 102 and vent conduit 108. The solenoid valve 112 may be closed during normal operation. However, in response to the at least one mass flow control valve 110 failing to modify the flow rate of the gas mixture across a range of flow rates (e.g., in the case of failure, described above), solenoid valve 112 may open allowing the gas mixture to bypass the at least one mass flow control valve 110.

In one embodiment of the present invention, mass flow control system 100 includes a mass flow meter 116 coupled to mass flow control valve 110 for measuring the mass flow of the gas mixture. In one embodiment the mass flow meter 116 may include a conventional thermal dissipation mass flow meter. In another embodiment, the mass flow meter 116 may include a conventional coriolis mass flow meter. These mass flow meters are merely examples and it is recognized that the mass flow meter may be any type of conventional mass flow meter known in the art.

Figure 2:
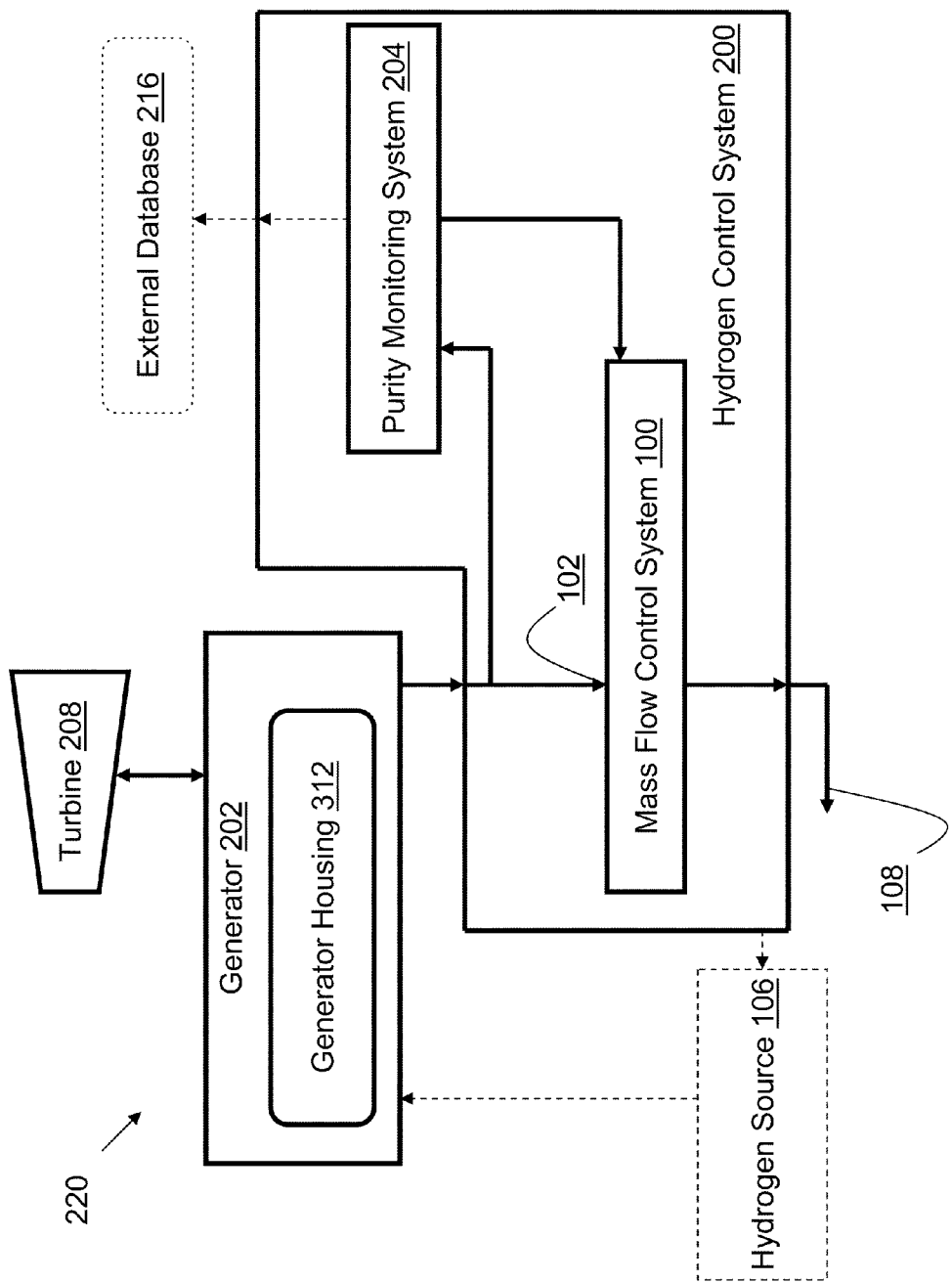
FIG. 2 shows a schematic illustration of an embodiment of a power generation system in accordance with an aspect of the invention.

Turning to FIG. 2, a schematic illustration of an embodiment of a power generation system 220 is shown. Power generation system 220 may include a generator 202 operatively connected to a turbine 208 and fluidly connected to a hydrogen control system 200. Generator 202, as is known in the art, may include a generator housing (or simply, housing) 312 that may contain a gas mixture including hydrogen. In this embodiment, hydrogen control system 200, may include components shown and described with reference to mass flow control system 100 of FIG. 1. Hydrogen control system 200 may further include a purity monitoring system (PMS) 204 (shown in phantom box in FIG. 1). More specifically, hydrogen control system 200 may include PMS 204, inlet 102, mass flow control system 100, and vent conduit 108. In this embodiment, mass flow control system 100 may be fluidly connected to vent conduit 108 and generator 202 (as similarly described with reference to FIG. 1) and operatively connected to PMS 204 (e.g., electrical via hard-wired or wireless means, mechanical via lever or actuators, electrical-mechanical via combinations of known electrical and mechanical components or any other known means). PMS 204 may also be fluidly connected to housing 312 via, e.g., a conventional conduit (numbering omitted). PMS 204 may monitor a purity level of hydrogen within housing 312 and output a purity reading signal to mass flow control system 100. Mass flow control system 100 may receive a portion of the gas mixture from housing 312 through inlet 102 and may modify the flow rate of the gas mixture extracted from housing 312 and sent to vent conduit 108 based upon the signal received from PMS 204. For example, where PMS 204 sends a signal to mass flow control system 100 indicating a hydrogen purity within housing 312 below that of a desired level, mass flow control system 100 may increase the mass flow rate through the system. In another example, where PMS 204 sends a signal to mass flow control system 100 indicating a hydrogen purity within housing 312 above that of a desired level, mass flow control system 100 may decrease the mass flow rate through the system. Vent conduit 108 may further be configured to receive a second portion of the gas mixture from PMS 204 and feed the second portion to an outlet, such as the ambient air. In one embodiment, PMS 204 may include a component for transmitting a signal to an external database 216 (shown in phantom box) via, e.g., a wireless or hard-wired means. External database 216 may be used for storing and/or analyzing data transmitted from PMS 204, where analysis may include diagnostic analysis, efficiency analysis, control analysis, etc. In another embodiment, PMS 204 may be operatively connected to a hydrogen source 106 via hydrogen control system 200 (shown in phantom box). The hydrogen source 106 may be fluidly connected to housing 312 via a conventional conduit, and may supply clean hydrogen to housing 312 in response to a signal from PMS 204.

Figure 3:
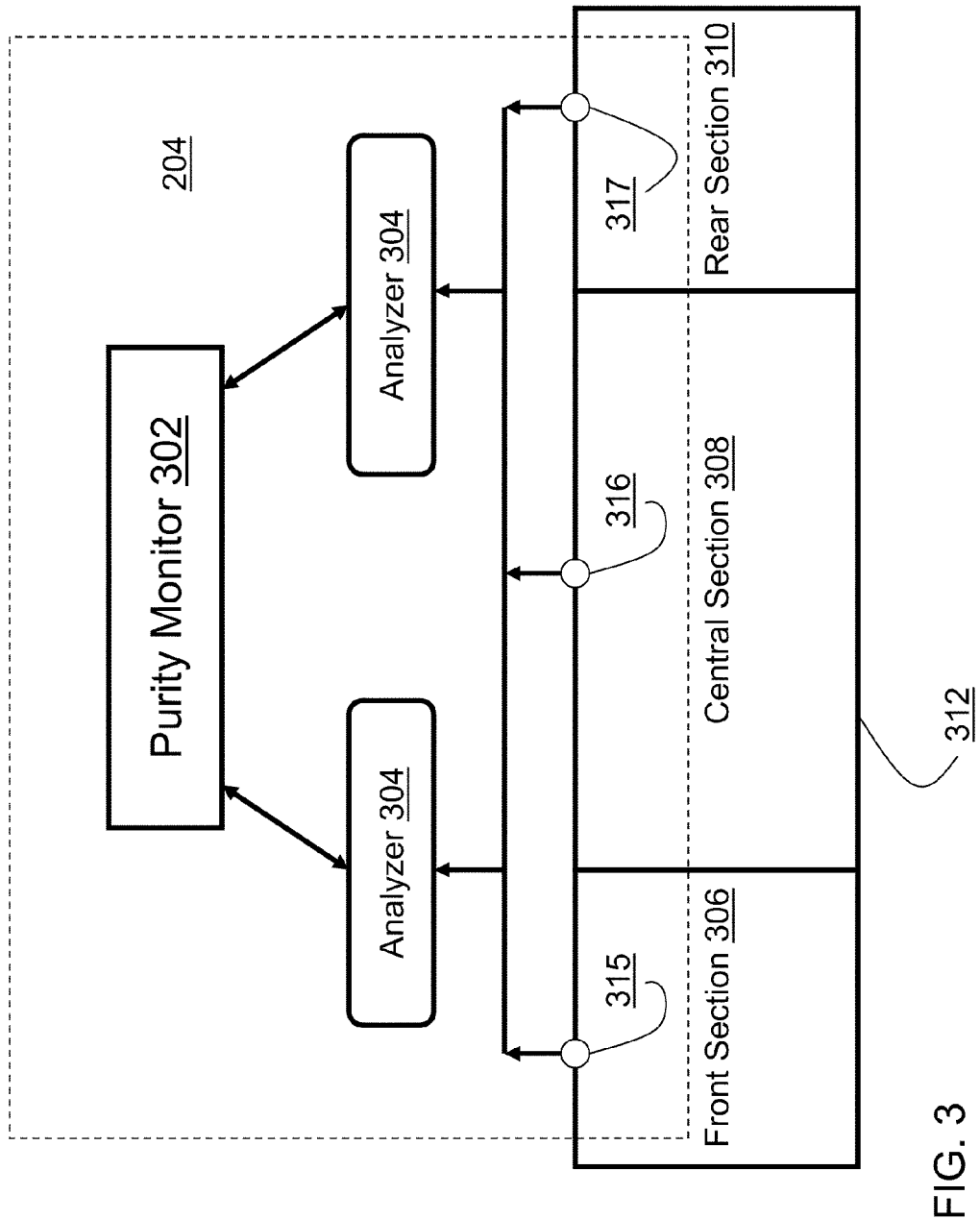
FIG. 3 shows a schematic illustration of an embodiment of a purity monitoring system in accordance with an aspect of the invention.

Turning to FIG. 3, a schematic illustration of an embodiment of PMS 204 of FIG. 2 is shown. According to an embodiment, PMS 204 may include a purity monitor 302 operatively connected to at least two analyzers 304. Analyzers 304 may be operatively connected to a plurality of sampling points, (e.g., sampling taps) 315, 316, 317, which may be disposed within a housing 312. It is understood that any number of sampling points and analyzers may be used according to embodiments of the invention. The sampling points may be positioned in any pattern within the housing (e.g., all sampling points disposed within a single section of a housing, all sampling points disposed evenly throughout sections of a housing, all sampling points in only some of the sections of a housing, etc.). Sampling points 315, 316, 317 may provide readings (e.g., gas samples), about the environmental conditions within housing 312 (such as, e.g., temperature, pressure, hydrogen purity) to analyzers 304 which may analyze and relay the readings to monitor 302. It is understood that analyzers 304 may be of any size or type known in the art and may differ depending upon their application or the system to which they are connected. Common numbering of analyzers 304 is for clarity and does not necessarily suggest these analyzers 304 are identical. In one embodiment, housing 312 may include a front section 306, a central section 308 and a rear section 310. As shown, sampling points 315, 316, 317 may be independently operatively connected to the at least two analyzers 304 and disposed such that at least one sampling point 315, 316, 317 is within each of the front section 306, central section 308 and rear section 310. More specifically, each of the at least two analyzers 304 may be connected to a single sampling point such that in an alarm state (e.g., a low hydrogen purity level reading) each analyzer 304 may read the same sampling point 315, 316 or 317 substantially simultaneously; thereby providing two comparable readings at the same sampling point. It is understood that connecting multiple analyzers to each sampling point may allow for, among other things, diagnosis of a fault in a particular analyzer. For example, where two of the analyzers 304 observe substantially distinct readings from the same sampling point (e.g., 315, 316, 317), one of the analyzers 304 may be experiencing a fault. Redundant analysis of each sampling point may provide for more efficient detection of system faults.

Figure 4:
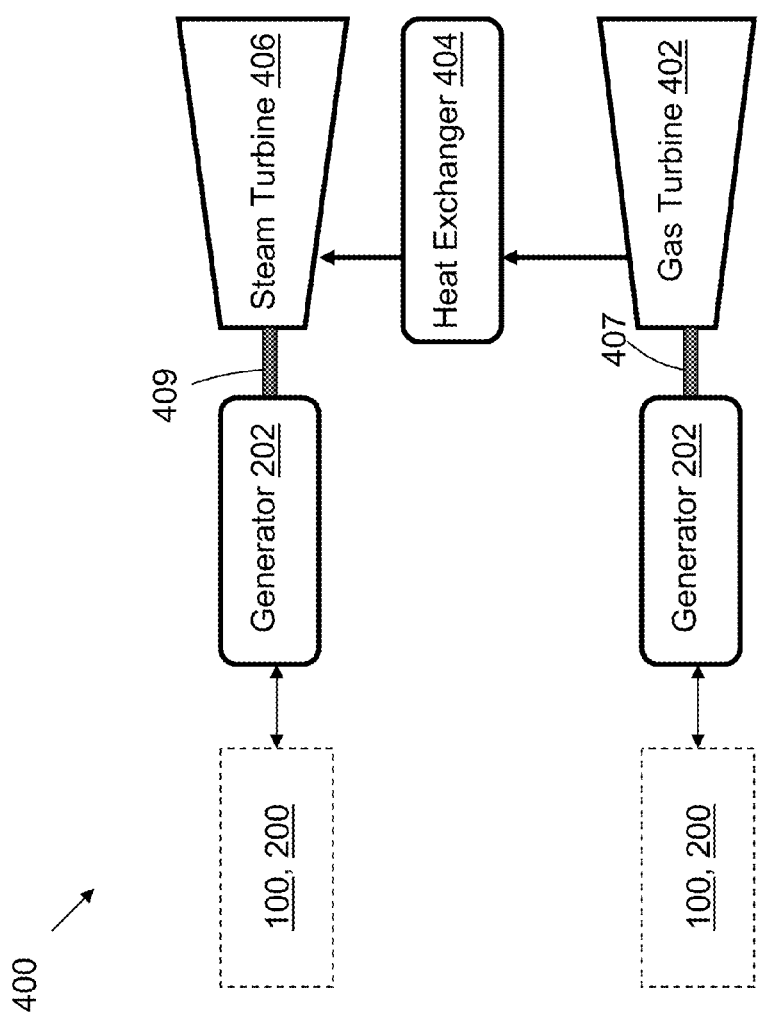
FIGS. 4-5 show schematic block diagrams illustrating portions of combined cycle power plant systems according to embodiments of the invention.
Figure 5:
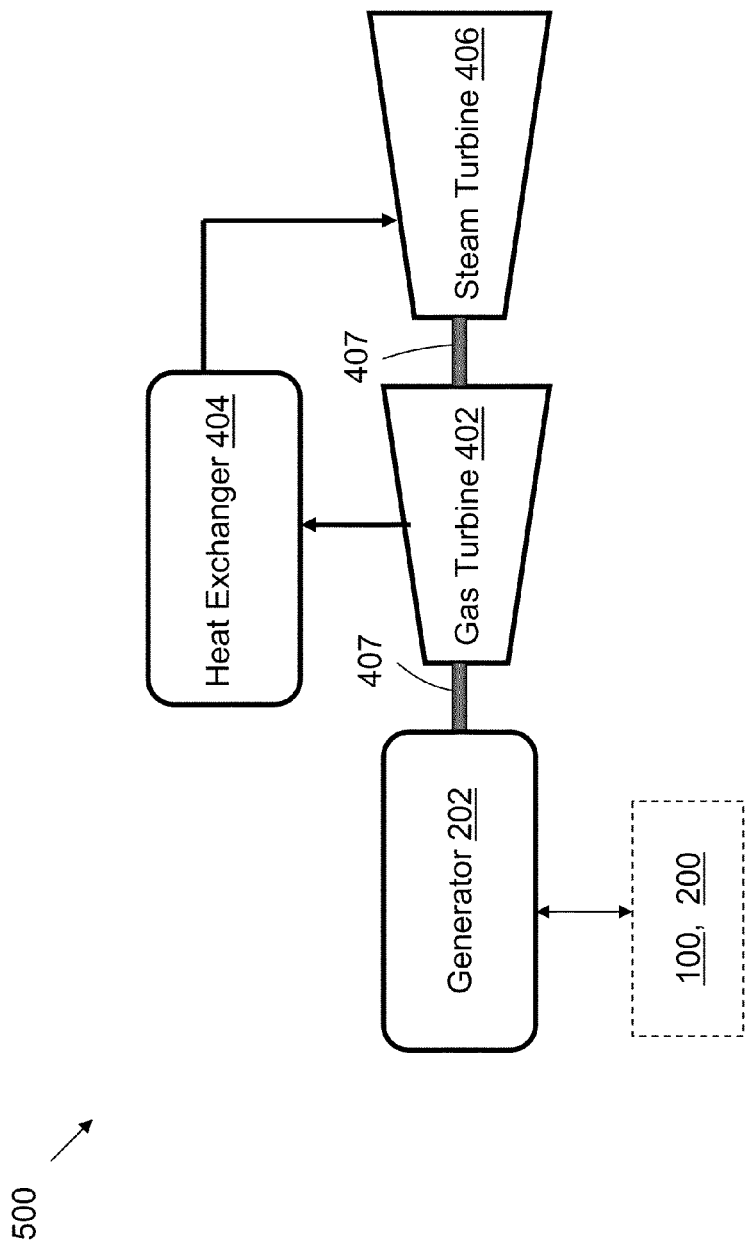

Turning to FIG. 4, a schematic view of portions of a multi-shaft combined cycle power plant 400 is shown. Combined cycle power plant 400 may include, for example, a gas turbine 402 operably connected to a generator 202. Generator 202 may be fluidly connected to mass flow control system 100 of FIG. 1 (or hydrogen control system 200 of FIG. 2, or other embodiments described herein). Generator 202 and gas turbine 402 may be mechanically coupled by a shaft 407, which may transfer energy between a drive shaft (not shown) of gas turbine 402 and generator 202. Also shown in FIG. 4 is a heat exchanger 404 operably connected to gas turbine 402 and a steam turbine 406. Heat exchanger 404 may be fluidly connected to both gas turbine 402 and steam turbine 406 via conventional conduits (numbering omitted). Heat exchanger 404 may be a conventional heat recovery steam generator (HRSG), such as those used in conventional combined cycle power systems. As is known in the art of power generation, HRSG 404 may use hot exhaust from gas turbine 402, combined with a water supply, to create steam which is fed to steam turbine 406. Steam turbine 406 may optionally be coupled to a second generator system 202 (via a second shaft 409). It is understood that generators 202 may be of any size or type known in the art and may differ depending upon their application or the system to which they are connected. Common numbering of the generators is for clarity and does not necessarily suggest these generators are identical. Generator system 202 and second shaft 409 may operate substantially similarly to generator system 202 and shaft 407 described above. In another embodiment, shown in FIG. 5, a single shaft combined cycle power plant 500 may include a single generator 202 coupled to both gas turbine 402 and steam turbine 406 via a single shaft 407.

The hydrogen control system of the present disclosure is not limited to any one particular generator, power generation system or other system, and may be used with other power generation systems and/or systems (e.g., combined cycle, simple cycle, nuclear reactor, etc.). Additionally, the hydrogen control system of the present invention may be used with other systems not described herein that may benefit from the flow and purity control of the mass flow control system and hydrogen control system described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hydrogen control system for a generator housing, the hydrogen control system comprising:

a purity monitoring system (PMS) operatively connected to the generator housing and configured to monitor environmental conditions in the generator housing;

a mass flow control system operatively connected to the PMS and fluidly connected to an outlet of the generator housing for extracting a gas mixture from the generator housing, the mass flow control system configured to measure a flow rate of the extracted gas mixture and modify the flow rate of the extracted gas mixture across a range of flow rates via at least one mass flow control valve, wherein the mass flow control system includes a solenoid valve fluidly connected to the generator housing, the mass flow control system further configured to open the solenoid valve and close the at least one mass flow control valve in response to the at least one mass flow control valve failing to perform the modifying of the flow rate of the extracted gas mixture across the range of flow rates; and a vent conduit fluidly connected to an outlet of the mass flow control system, the vent conduit for receiving a portion of the extracted gas mixture from the mass flow control system and feeding the portion of the extracted gas mixture to ambient.

2. The hydrogen control system of claim 1, further comprising a mass flow meter operatively connected to the generator housing and adapted to measure a flow rate of the extracted gas mixture.

3. The hydrogen control system of claim 1, wherein the PMS monitors a purity of hydrogen in the generator housing.

4. The hydrogen control system of claim 1, wherein the mass flow control system adjusts the flow rate of the gas mixture based upon a signal received from the PMS.

5. The hydrogen control system of claim 4, wherein the generator housing has a front section, a central section and a rear section, and the PMS includes at least two analyzers independently operatively connected to at least one of the front section of the housing, the rear section of the housing and the central section of the housing.

6. The hydrogen control system of claim 5, wherein each of the at least two analyzers is independently connected to a common sampling point in the one of the front section of the housing, the rear section of the housing or the central section of the housing.

7. The hydrogen control system of claim 2, wherein the mass flow meter is adapted to transmit a measured value of the mass flow rate of the extracted gas mixture to the PMS.

8. The hydrogen control system of claim 1, further comprising a thermal dissipation mass flow meter for measuring the mass flow rate of the extracted gas mixture.

9. The hydrogen control system of claim 1, further comprising a coriolis mass flow meter for measuring the mass flow rate of the extracted gas mixture.

10. The hydrogen control system of claim 3, wherein the PMS includes a component for transmitting a signal to an external database.

11. The hydrogen control system of claim 3, further comprising a hydrogen source fluidly connected to the generator housing and operatively connected to the PMS, the hydrogen source providing clean hydrogen to the generator housing in response to a signal from the PMS.

12. A power generation system comprising:
a turbine;
a generator operatively connected to the turbine, the generator including a housing containing a gas mixture;
a purity monitoring system (PMS) fluidly connected to the housing, the PMS configured to monitor a purity of hydrogen in the gas mixture;
a mass flow control system operatively connected to the PMS and fluidly connected to an outlet of the housing for extracting a portion of the gas mixture from the housing, the mass flow control system configured to measure a flow rate of the extracted portion of the gas mixture and modify the flow rate of the extracted portion of the gas mixture across a range of flow rates via at least one mass flow control valve,
wherein the mass flow control system includes a solenoid valve fluidly connected to the outlet of the housing, the mass flow control system further configured to open the solenoid valve and close the at least one mass flow control valve in response to the at least one mass flow control valve failing to perform the modifying of the flow rate of the extracted portion of the gas mixture across the range of flow rates; and
a vent conduit fluidly connected to an outlet of the mass flow control system, the vent conduit for receiving the extracted gas mixture from the mass flow control system and feeding the extracted gas mixture to ambient.

13. The power generation system of claim 12, wherein the mass flow control system includes a mass flow meter operatively connected to the housing and adapted to measure a flow rate of the extracted portion of the gas mixture.

14. The power generation system of claim 12, wherein the at least one mass flow control valve adjusts the flow rate of the extracted portion of the gas mixture based upon a signal received from the PMS.

15. The power generation system of claim 12, further comprising a thermal dissipation mass flow meter for measuring the mass flow rate of the extracted portion of the gas mixture.

16. The hydrogen control system of claim 12, further comprising a coriolis mass flow meter for measuring the mass flow rate of the extracted portion of the gas mixture.

17. The power generation system of claim 12, wherein the PMS includes a component for transmitting a signal to an external database.

18. The power generation system of claim 12, wherein the housing has a front section, a central section and a rear section and the PMS includes at least two analyzers independently operatively connected to at least one of the front section of the housing, the rear section of the housing and the central section of the housing.

19. The power generation system of claim 18, wherein each of the at least two analyzers is independently connected to a common sampling point in one of the front section of the housing, the rear section of the housing or the central section of the housing.

20. A combined cycle power generation system comprising:
a gas turbine;
a heat recovery steam generator (HRSG) operatively connected to the gas turbine;
a steam turbine operatively connected to the HRSG;
a generator operatively connected to at least one of the gas turbine or the steam turbine, the generator including a housing, the housing containing a gas mixture;
a purity monitoring system (PMS) fluidly connected to the generator, the PMS monitoring a purity of hydrogen in the gas mixture;
a mass flow control system operatively connected to the PMS and fluidly connected to an outlet of the housing for extracting a gas mixture from the housing, the mass flow control system configured to measure a flow rate of the extracted gas mixture and modify the flow rate of the extracted gas mixture across a range of flow rates via at least one mass flow control valve,
wherein the mass flow control system includes a solenoid valve fluidly connected to the outlet of the housing, the mass flow control system further configured to open the solenoid valve and close the at least one mass flow control valve in response to the at least one mass flow control valve failing to perform the modifying of the flow rate across the range of flow rates; and
a vent conduit fluidly connected to an outlet of the mass flow control system, the vent conduit for receiving a portion of the extracted gas mixture from the mass flow control system and feeding the portion of the extracted gas mixture to ambient.

* * * * *